US010827159B2

(12) United States Patent
Wang et al.

(10) Patent No.: US 10,827,159 B2
(45) Date of Patent: Nov. 3, 2020

(54) METHOD AND APPARATUS OF SIGNALLING SYNTAX FOR IMMERSIVE VIDEO CODING

(71) Applicant: MEDIATEK INC., Hsin-Chu (TW)

(72) Inventors: Peng Wang, Beijing (CN); Hung-Chih Lin, Hsin-Chu (TW); Jian-Liang Lin, Hsin-Chu (TW); Shen-Kai Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/105,147

(22) Filed: Aug. 20, 2018

(65) Prior Publication Data

US 2019/0068949 A1    Feb. 28, 2019

Related U.S. Application Data

(60) Provisional application No. 62/549,016, filed on Aug. 23, 2017.

(30) Foreign Application Priority Data

Aug. 17, 2018  (WO) ................ PCT/CN2018/100953

(51) Int. Cl.
*H04N 13/178* (2018.01)
*H04N 19/597* (2014.01)
(Continued)

(52) U.S. Cl.
CPC ....... *H04N 13/178* (2018.05); *H04N 5/23238* (2013.01); *H04N 13/139* (2018.05); *H04N 19/597* (2014.11); *H04N 19/70* (2014.11)

(58) Field of Classification Search
None
See application file for complete search history.

(56) References Cited

U.S. PATENT DOCUMENTS

2017/0186219 A1\*  6/2017  Xu .......................... G06T 15/04
2017/0200255 A1   7/2017  Lin et al.
(Continued)

FOREIGN PATENT DOCUMENTS

| CN | 105898254 A | 8/2016 |
|----|-------------|--------|
| CN | 106358033 A | 1/2017 |

(Continued)

*Primary Examiner* — Fernando Alcon
(74) *Attorney, Agent, or Firm* — McClure, Qualey & Rodack, LLP

(57) ABSTRACT

According to one method, at a source side or an encoder side, a selected viewport associated with the 360-degree virtual reality images is determined. One or more parameters related to the selected pyramid projection format are then determined. According to the present invention, one or more syntax elements for said one or more parameters are included in coded data of the 360-degree virtual reality images. The coded data of the 360-degree virtual reality images are provided as output data. At a receiver side or a decoder side, one or more syntax elements for one or more parameters are parsed from the coded data of the 360-degree virtual reality images. A selected pyramid projection format associated with the 360-degree virtual reality images is determined based on information including said one or more parameters. The 360-degree virtual reality images are then recovered according to the selected viewport.

12 Claims, 5 Drawing Sheets

(51) Int. Cl.
*H04N 13/139* (2018.01)
*H04N 5/232* (2006.01)
*H04N 19/70* (2014.01)

(56) References Cited

U.S. PATENT DOCUMENTS

| | | | |
|---|---|---|---|
| 2017/0295356 A1* | 10/2017 | Abbas | H04N 5/2251 |
| 2018/0077451 A1* | 3/2018 | Yip | H04N 13/111 |
| 2018/0098131 A1* | 4/2018 | Zhou | H04N 21/6373 |
| 2018/0189958 A1* | 7/2018 | Budagavi | H04N 21/84 |
| 2018/0192001 A1* | 7/2018 | Boyce | H04N 19/597 |
| 2018/0332265 A1* | 11/2018 | Hwang | H04N 21/8451 |
| 2018/0342043 A1* | 11/2018 | Vandrotti | H04N 5/23238 |
| 2018/0376126 A1* | 12/2018 | Hannuksela | H04N 19/176 |
| 2019/0012839 A1* | 1/2019 | Wang | G06T 19/006 |
| 2019/0158815 A1* | 5/2019 | He | H04N 21/23432 |
| 2019/0215532 A1* | 7/2019 | He | G06T 17/10 |

FOREIGN PATENT DOCUMENTS

| | | |
|---|---|---|
| CN | 106507094 A | 3/2017 |
| CN | 106780317 A | 5/2017 |
| CN | 106803884 A | 6/2017 |
| CN | 106803994 A | 6/2017 |

* cited by examiner

METHOD AND APPARATUS OF SIGNALLING SYNTAX FOR IMMERSIVE VIDEO CODING

CROSS REFERENCE TO RELATED APPLICATIONS

The present invention claims priority to U.S. Provisional Patent Application Ser. No. 62/549,016, filed on Aug. 23, 2017, and PCT Patent Application, Serial No. PCT/CN2018/100953, filed on Aug. 17, 2018. The U.S. Provisional Patent Application and PCT Patent Application are hereby incorporated by reference in its entirety.

FIELD OF THE INVENTION

The present invention relates to image/video processing or coding for 360-degree virtual reality (VR) images/sequences. In particular, the present invention relates to syntax signalling for immersive video coding in a pyramid projection format.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a panoramic camera or a set of cameras arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

The 360-degree virtual reality (VR) images may be captured using a 360-degree spherical panoramic camera or multiple images arranged to cover all filed of views around 360 degrees. The three-dimensional (3D) spherical image is difficult to process or store using the conventional image/video processing devices. Therefore, the 360-degree VR images are often converted to a two-dimensional (2D) format using a 3D-to-2D projection method. For example, equirectangular projection (ERP) and cubemap projection (CMP) have been commonly used projection methods. Accordingly, a 360-degree image can be stored in an equirectangular projected format. The equirectangular projection maps the entire surface of a sphere onto a flat image. The vertical axis is latitude and the horizontal axis is longitude. For the ERP projection, the areas in the north and south poles of the sphere are stretched more severely (i.e., from a single point to a line) than areas near the equator. Furthermore, due to distortions introduced by the stretching, especially near the two poles, predictive coding tools often fail to make good prediction, causing reduction in coding efficiency.

In the present invention, syntax signalling related to new projection formats is disclosed.

BRIEF SUMMARY OF THE INVENTION

Methods and apparatus of processing 360-degree virtual reality images are disclosed. According to one method, at a source side or an encoder side, input data for 360-degree virtual reality images are received. A selected viewport associated with the 360-degree virtual reality images is determined. One or more parameters related to the selected pyramid projection format corresponding to the selected viewport are then determined. The pyramid projection format includes a primary viewport face and four secondary viewport faces. According to the present invention, one or more syntax elements for said one or more parameters are included in coded data of the 360-degree virtual reality images. The coded data of the 360-degree virtual reality images are provided as output data.

At a receiver side or a decoder side, coded data for 360-degree virtual reality images are received. One or more syntax elements for one or more parameters are parsed from the coded data of the 360-degree virtual reality images. A selected pyramid projection format associated with the 360-degree virtual reality images is determined based on information including said one or more parameters. The pyramid projection format includes a primary viewport face and four secondary viewport faces. The 360-degree virtual reality images are then recovered according to a selected viewport corresponding to the selected pyramid projection format.

In one embodiment, said one or more parameters comprise yaw of main viewport centre, pitch of main viewport centre, width of main viewport face, FOV (field of view) angle of main viewport face, non-uniform factor for the four secondary viewport faces, or a combination thereof. In another embodiment, said one or more parameters comprise a packing type, a displacement indicator regarding whether secondary viewport face centre displacement is allowed, horizontal centre displacement, vertical centre displacement, or a combination thereof. When the displacement indicator indicates the secondary viewport centre displacement is allowed, one or more syntax element for the horizontal centre displacement, the vertical centre displacement, or both are included in the coded data of the 360-degree virtual reality images

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A viewport-based pyramid projection format for VR360 video streaming has been disclosed in JVET-E0058 (Peng Wang, et al., "AHG 8: A viewport-based pyramid projection for VR360 video streaming", Joint Video Exploration Team (WET) of ITU-T SG 16 WP 3 and ISO/IEC JTC 1/SC 29/WG 11, 5th Meeting: Geneva, CH, 12-20 Jan. 2017, Document: JVET-E0058). The viewport-based pyramid projection format is composed of two regions: primary region and secondary region. The primary area preserves high-fidelity viewing region specified by a pre-defined FOV while the secondary area represents a down-sampled version of the region outside the primary area. In other words, the bandwidth of the viewport-based projection format can be significantly reduced for streaming application. The viewport switching scheme allows viewing the VR videos in different viewports. These primary areas of these viewport videos comprise the entire 360°×180° region. Usually, the centre of the primary area of each viewport video is indicated by the yaw and pitch angles. Thus, according to the user's viewing angle, the user can receive the corresponding viewport video that encompasses the viewing area.

Figure 1A:
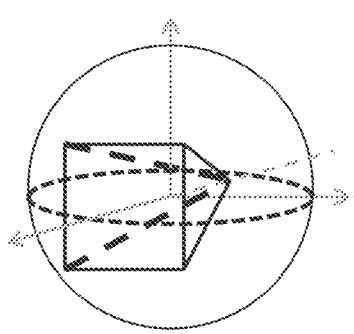
FIG. 1A illustrates an example of viewport that is represented as a pyramid. The 360VR video contents on the sphere are projected on an inscribed pyramid, which comprises an apex, a rectangular base and four triangle lateral faces.
Figure 1B:
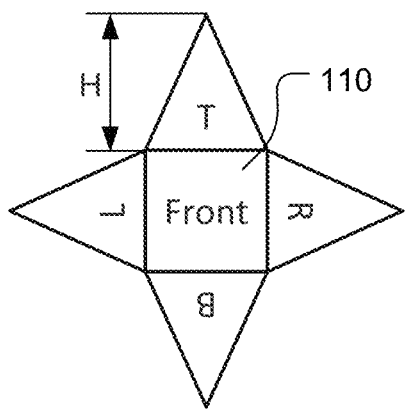
FIG. 1B illustrates an example of the pyramid consisting of five faces referred as Front or Main and four lateral faces labelled as R (right), L (left), T (Top) and B (Bottom).
Figure 1C:
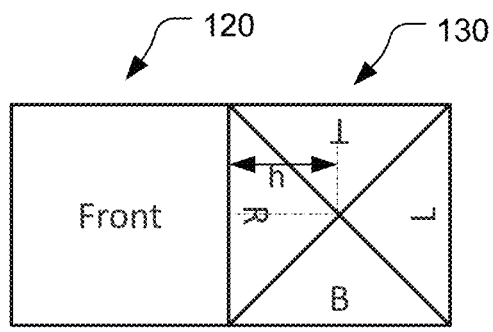
FIG. 1C illustrates an example of compact pyramid projection layout, where the triangle faces with shrunk height are rearranged with the Front face to form a compact layout.

In FIG. 1A, the viewport is represented as a pyramid and the 360VR video contents on the sphere are projected on an inscribed pyramid, which comprises an apex, a rectangular base and four triangle lateral faces. In the particular example shown in FIG. 1A, the base of the pyramid corresponds to a square. The pyramid consists of five faces (i.e., the square base 110 and four triangle lateral faces) as shown in FIG. 1B, where the base face 110 is referred as Front or Main and the four lateral faces are labelled as R (right), L (left), T (Top) and B (Bottom). The height of each unfolded lateral faces is referred as H as shown in FIG. 1B. The main face is the primary viewport face, which contains a 90°×90° region. The other four isosceles triangle faces are referred as secondary faces. As illustrated in FIG. 1C, these triangle faces with shrunk height (labelled as h) are rearranged with the Front face 120 to form a very compact layout. In addition, there is no discontinuous edge between any two connected faces in the compact layout. In FIG. 1C, the four secondary faces with shrunk height in a compact format is referred as a compact secondary view 130. The whole image (i.e., the primary view 120 and the compact secondary view 130) in the compact format is referred as a pyramid compact layout.

Figure 1D:
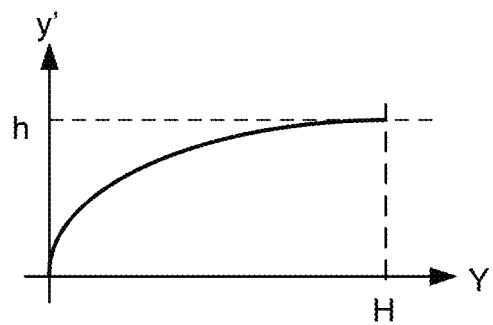
FIG. 1D illustrates an example of exponential non-uniform mapping function.

When packing the five faces into the compact layout, the height of the four triangle faces is shrunk from H to h. The triangle faces can be down-sampled vertically to reduce the number of samples. A linear mapping function can be used to shrink from H to h in the vertical direction. However, to preserve more details near the main projection face, a re-sampling process may use a non-uniform mapping function to result in denser samples of the corresponding lateral projection face U/B/L/R near the main projection face. In a case where the non-uniform mapping function is an exponential function as shown in FIG. 1D, the non-uniform mapping function may be expressed by using the following equation.

$$\frac{y'}{h} = 1 - \left(1 - \frac{Y}{H}\right)^n.$$

In the above equation, n is positive and n≠1, Y is the vertical coordinate of an original lateral projection face, and y' is the vertical coordinate of the vertically shrunk lateral projection face. The parameter n is referred as a non-uniform factor in this disclosure. The non-uniformly down-sampling process can achieve that the degradation of the image quality of the projection area close to the primary region is lower than that of the area far from the primary region.

In order to accommodate various view-point based pyramid projection formats, the parameters associated with a selected pyramid project format need to be signalled so that a decoder can properly reconstruct the VR video. Accordingly, syntax elements for the parameters associated with a selected pyramid project format are disclosed in the present invention. For example, the syntax elements may include one of more the following syntax elements:

signed int(16) main_viewpoint_center_yaw;
signed int(16) main_viewpoint_center_pitch;
unsigned int(16) main_viewpoint_face_width;
unsigned int(8) main_viewpoint_fov_angle;
unsigned int(32) non_uniform_factor;

In the above list, main_viewpoint_center_yaw specifies the value of yaw (i.e., longitude) θ. The rotation direction is clockwise and the value range is [−180°, 180°]. In the above list, main_viewpoint_center_pitch specifies the value of pitch (i.e., latitude) φ. The rotation direction is clockwise and the value range is [−90°, 90°].

Figure 2:
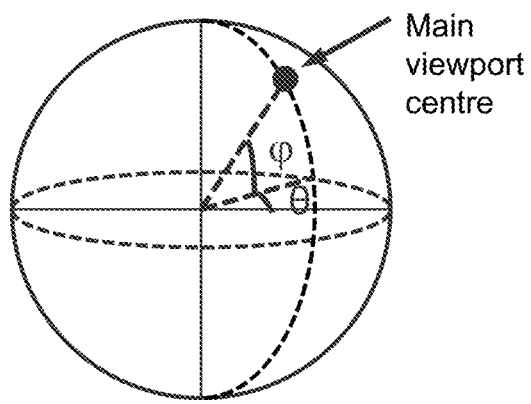
FIG. 2 illustrates an example of viewpoint based pyramid projection, where the viewpoint centre, the value of yaw (i.e., longitude) θ and the value of pitch (i.e., latitude) y are indicated.

FIG. 2 illustrates an example of view-point based pyramid projection, where the view-point centre is indicated by a black dot; the value of yaw (i.e., longitude) θ and the value of pitch (i.e., latitude) φ are indicated.

Figure 3:
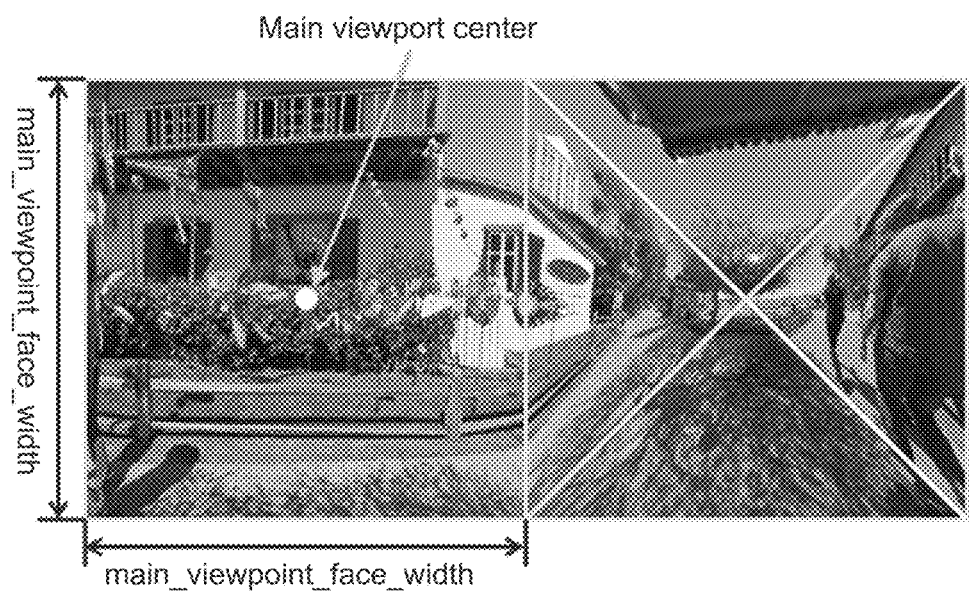
FIG. 3 depicts an example of the viewport image of the proposed layout with (yaw, pitch)=(0, 0) and non-uniform factor n=2.5.

FIG. 3 depicts an example of the viewport image of the proposed layout with (yaw, pitch)=(0, 0) and non-uniform factor n=2.5. In FIG. 3, the centre of the main face is indicated by a white dot. The boundaries of the four triangle faces are indicated by white lines in FIG. 3. As shown in FIG. 3, the image contents are continuous across the boundaries. The main_viewpoint_face_width specifies the pixels of the width and height of the main viewport face. The main_viewpoint_face_width for the exemplary picture in a pyramid projection format is indicated in FIG. 3.

Figure 4:
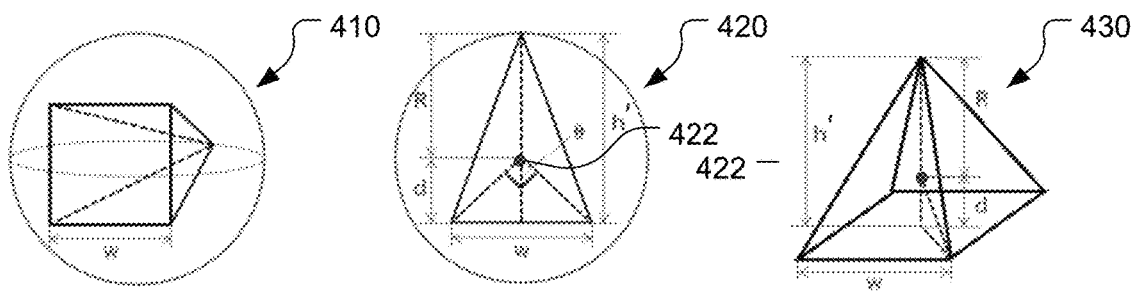
FIG. 4 depicts an example of the viewport represented as a pyramid enclosed in a sphere, where related parameters are indicated.

In FIG. 4, the viewport is represented as a pyramid enclosed in a sphere as shown in illustration 410. The main_viewpoint_fov_angle specifies the degree of angle, which defines the field-of-view (FOV) size of the squared primary viewing region. Let d is the distance between the centre of sphere and main viewport face. A cross section of the pyramid passing the apex and a line splitting the primary view into two rectangles of equal size is represented in FIG. 4. The width (w) of main viewport face and the height (h') of pyramid are calculated as:

$$w = 2 \times \tan\left(\frac{\theta}{2}\right) \times d, \quad (1)$$

$$h' = R + d = \sqrt{\frac{w^2}{2} + d^2} + d \quad (2)$$

FIG. 4 also illustrates the related parameters for deriving the width (w) of main viewport face and the height (h') of pyramid. In FIG. 4, illustration 410 shows a perspective view of a pyramid enclosed in a sphere with the main face in the front, where the width (w) of the main viewport face is indicated. Illustration 420 represents a side view of the pyramid enclosed in the sphere, where the radius (R) of the sphere, the height (h') of pyramid, the centre of the sphere 422, the distance (d) between the centre of sphere and the value of field-of-view (FOV) angle (θ) are indicated. Illustration 430 represents a three-dimensional view of the pyramid enclosed in the sphere, where the radius (R) of the sphere, the height (h') of pyramid, the centre of the sphere 422 and the distance (s) between the centre of sphere and main viewport face are indicated.

Figure 5:
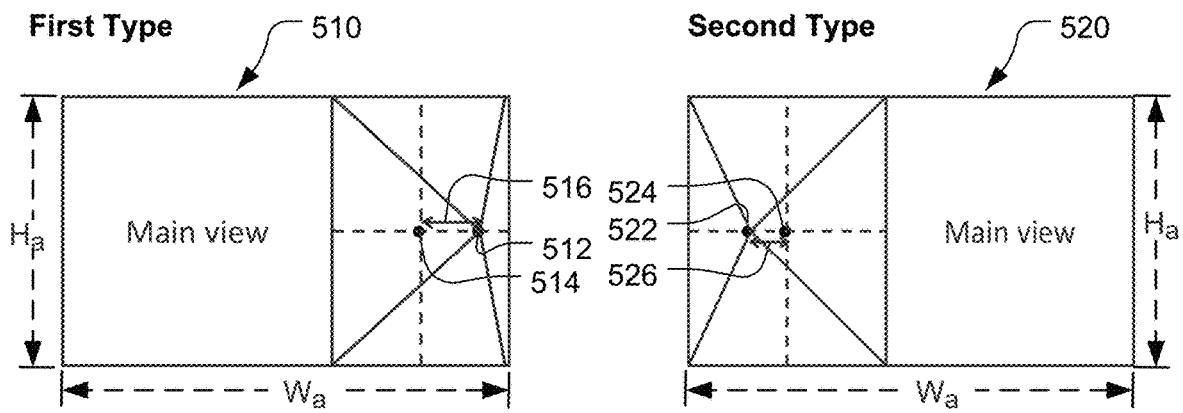
FIG. 5 illustrates examples of asymmetric pyramid projection layout in two packing types (first type, second type), where the primary view and the secondary view are stacked horizontally.

In FIGS. 1A-C, the four triangle lateral faces are symmetrical around the main face and have the same shape and size. When the four triangle lateral faces are folded into a square in the right side of the layout in FIG. 1C, the four triangle lateral faces are symmetric with the apex joined in the centre of the square on the right side of the layout in FIG. 1C. In the present invention, pyramid projection layout with asymmetric lateral faces is also disclosed. FIG. 5 illustrates examples of asymmetric pyramid projection layout in two packing types (first type 510, second type 520), where the primary view and the secondary view are stacked horizontally. The picture width and height of the asymmetric pyramid projection layout are referred as $W_a$ and $H_a$ respectively. In other words, the frame resolution of the asymmetric pyramid projection layout is $W_a \times H_a$. The resolution of the main view is $H_a \times H_a$. The resolution of the secondary view is $(W_a - H_a) \times H_a$. The apex location (512, 522) is offset from the default centre (514, 524) of the secondary view and the horizontal offset distance is indicated (516 and 526) in FIG. 5 respectively. In addition, there is no discontinuous edge between any two connected faces in the compact layout.

Figure 6:
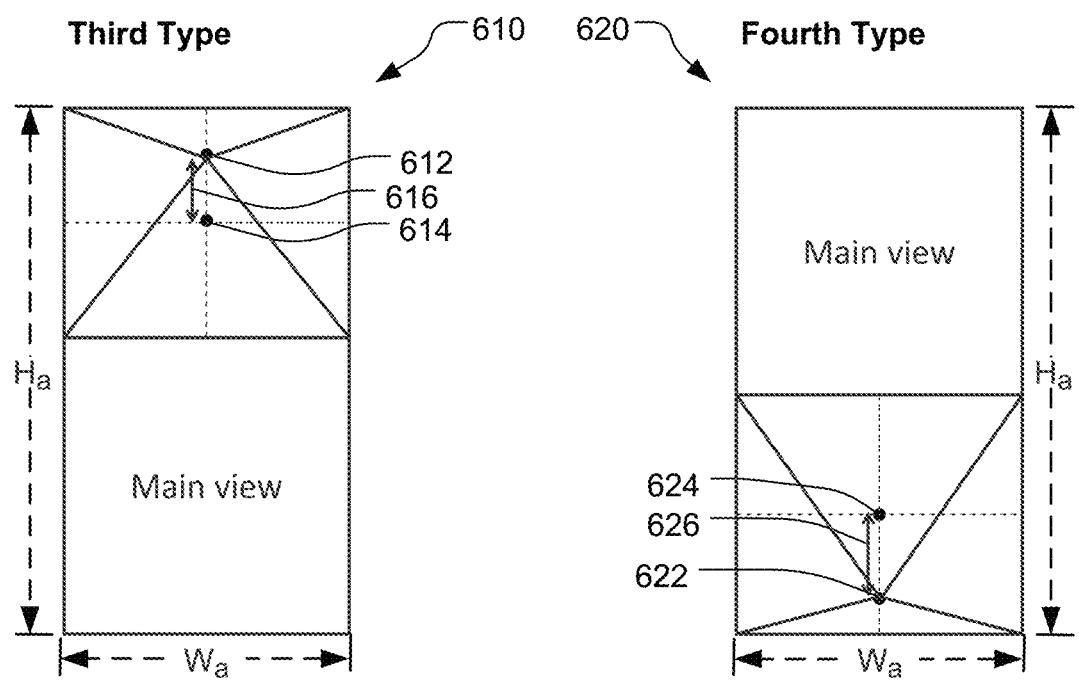
FIG. 6 illustrates examples of asymmetric pyramid projection layout in two packing types (third type, fourth type), where the primary view and the secondary view are stacked vertically.

FIG. 6 illustrates examples of asymmetric pyramid projection layout in two packing types (third type 610, fourth type 620), where the primary view and the secondary view are stacked vertically. The picture width and height of the asymmetric pyramid projection layout are referred as $W_a$ and $H_a$ respectively. In other words, the frame resolution of the asymmetric pyramid projection layout is $W_a \times H_a$. The resolution of the main view is $W_a \times W_a$. The resolution of the secondary view is $W_a \times (H_a - W_a)$. The apex location (612, 622) is offset from the default centre (614, 624) of the secondary view and the vertical offset distance is indicated (616 and 626) in FIG. 6 respectively. In addition, there is no discontinuous edge between any two connected faces in the compact layout.

Figure 7:
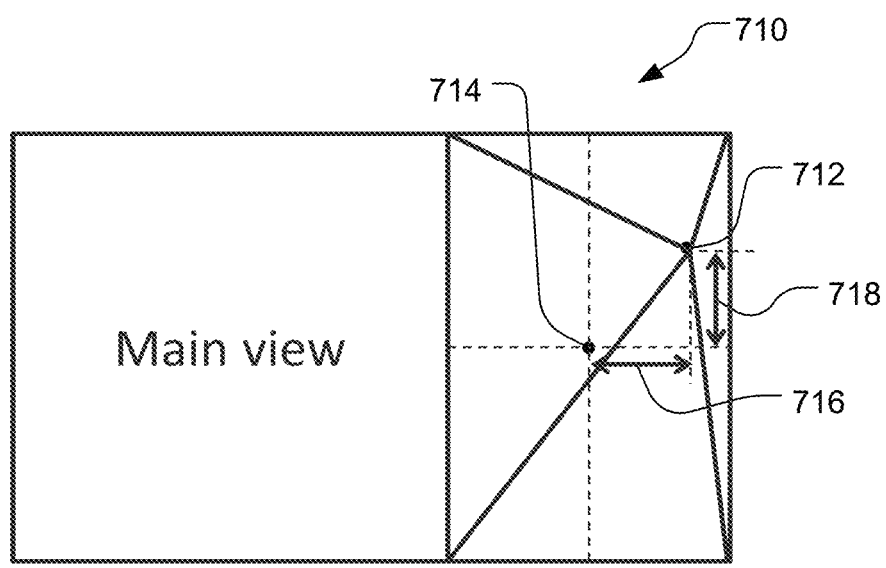
FIG. 7 illustrates an example of asymmetric pyramid projection layout, where the apex location is offset from the default centre in both horizontal and vertical directions.

FIG. 7 illustrates an example of asymmetric pyramid projection layout 710, where the primary view and the secondary view are stacked horizontally (i.e., first type). The apex location (712) is offset from the default centre (714) in both horizontal and vertical directions. The horizontal offset (716) and vertical offset (718) from the default centre of the secondary view are indicated in FIG. 7. In addition, there is no discontinuous edge between any two connected faces in the compact layout.

In order to support the asymmetric pyramid projection layout, the present invention also discloses additional syntax elements to be signalled in the video bitstream so that a decoder can recover the selected asymmetric pyramid projection layout accordingly. The additional syntax elements comprise:

packing_type;
disable_center_displacement;
center_displacement_x;
center_displacement_y;

As mentioned earlier, there are four types of asymmetric pyramid projection layouts as shown in FIG. 5 and FIG. 6. Syntax element packing_type identifies which of the four types is selected. Syntax element disable_center_displacement identifies whether centre displacement is disabled. If disable_center_displacement is equal to 1, center_displacement_x and center_displacement_y are inferred to 0; otherwise, the centre displacements are signalled using syntax elements center_displacement_x and center_displacement_y (in unit of pixel). The apex centre of the asymmetric pyramid projection layouts can be determined from the default centre of the secondary view and the offset values. The x coordinate x_c (measured from left edge of the frame) and they coordinate y_c (measured from top edge of the frame) of the default centre of the secondary view can be determined for the four types according to:

Type 1: x_c=$(W_a+H_a)$/2, y_c=$H_a$/2;
Type 2: x_c=$(W_a-H_a)$/2, y_c=$H_a$/2;
Type 3: x_c=$W_a$/2, y_c=$(H_a-W_a)$/2;
Type 4: x_c=$W_a$/2, y_c=$(H_a+W_a)$/2.

When the apex is on the right of the default centre, the center_displacement_x>0. When the apex is on the left of the default centre, the center_displacement_x<0. When the apex is above of the default centre, the center_displacement_y>0. When the apex is below the default centre, the center_displacement_y<0. The centre coordinate of the apex is calculated as follows for four types when disable_center_displacement is equal to 0 (i.e., asymmetric projection format allowed):

Types 1 and 2: (x_c+center_displacement_x, y_c);
Types 3 and 4: (x_c, y_c+center_displacement_y).

For the asymmetric pyramid projection layout in FIG. 7, where the apex location (712) is offset from the default centre (714) in both horizontal and vertical directions, the centre coordinate of the apex is calculated as follows when disable_center_displacement is equal to 0 (i.e., asymmetric projection format allowed):

(x_c+center_displacement_x, y_c+center_displacement_y).

Figure 8:
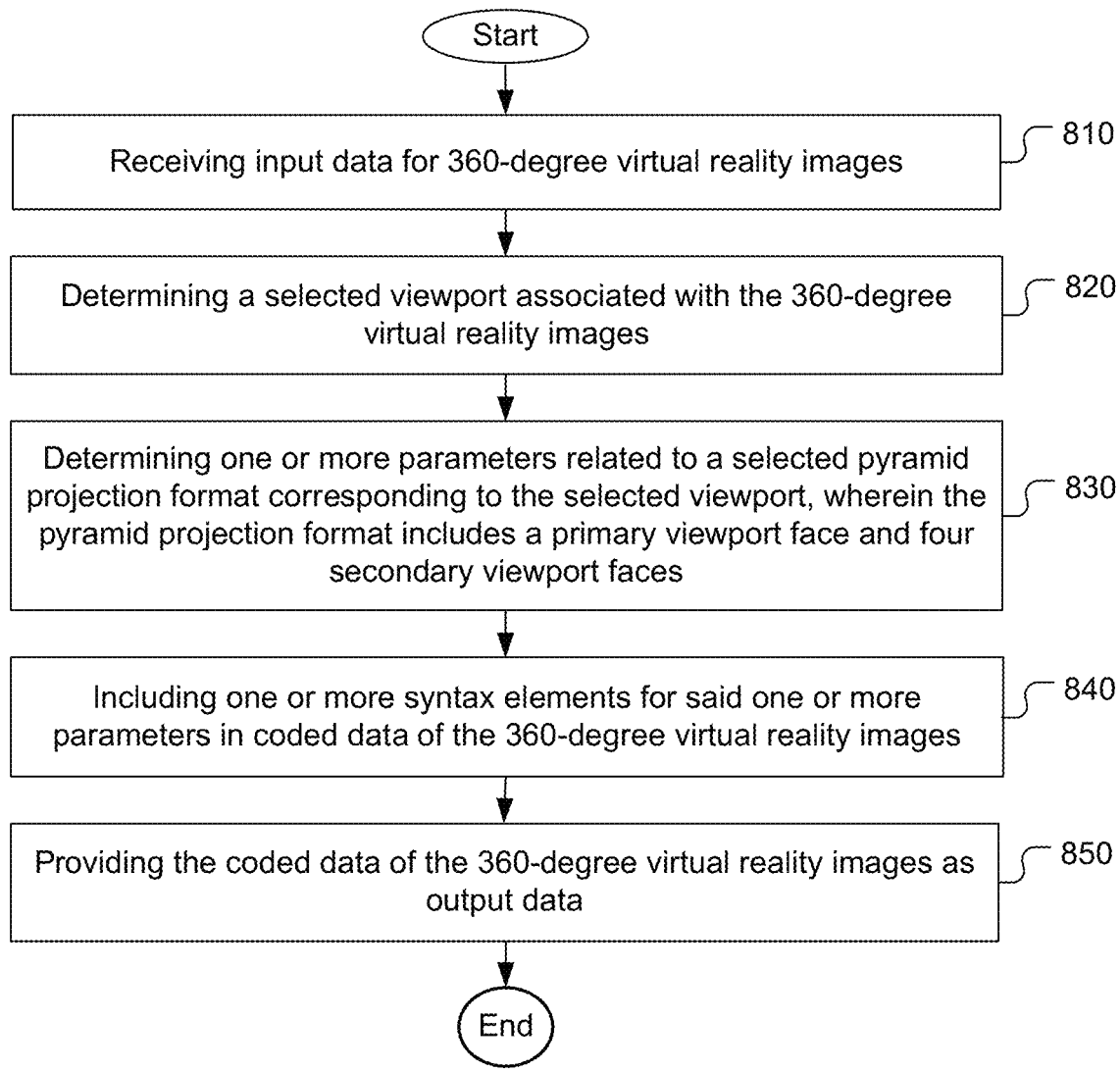
FIG. 8 illustrates an exemplary flowchart of a system for processing 360-degree virtual reality images at a source side or encoder side according to an embodiment of the present invention.

FIG. 8 illustrates an exemplary flowchart of a system for processing 360-degree virtual reality images at a source side or encoder side according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data for 360-degree virtual reality images are received in step 810. A selected viewport associated with the 360-degree virtual reality images is determined in step 820. One or more parameters related to the selected pyramid projection format corresponding to the selected viewport, wherein the pyramid projection format includes a primary viewport face and four secondary viewport faces are determined in step 830. One or more syntax elements for said one or more parameters are included in coded data of the 360-degree virtual reality images in step 840. The coded data of the 360-degree virtual reality images are provided as output data in step 850.

Figure 9:
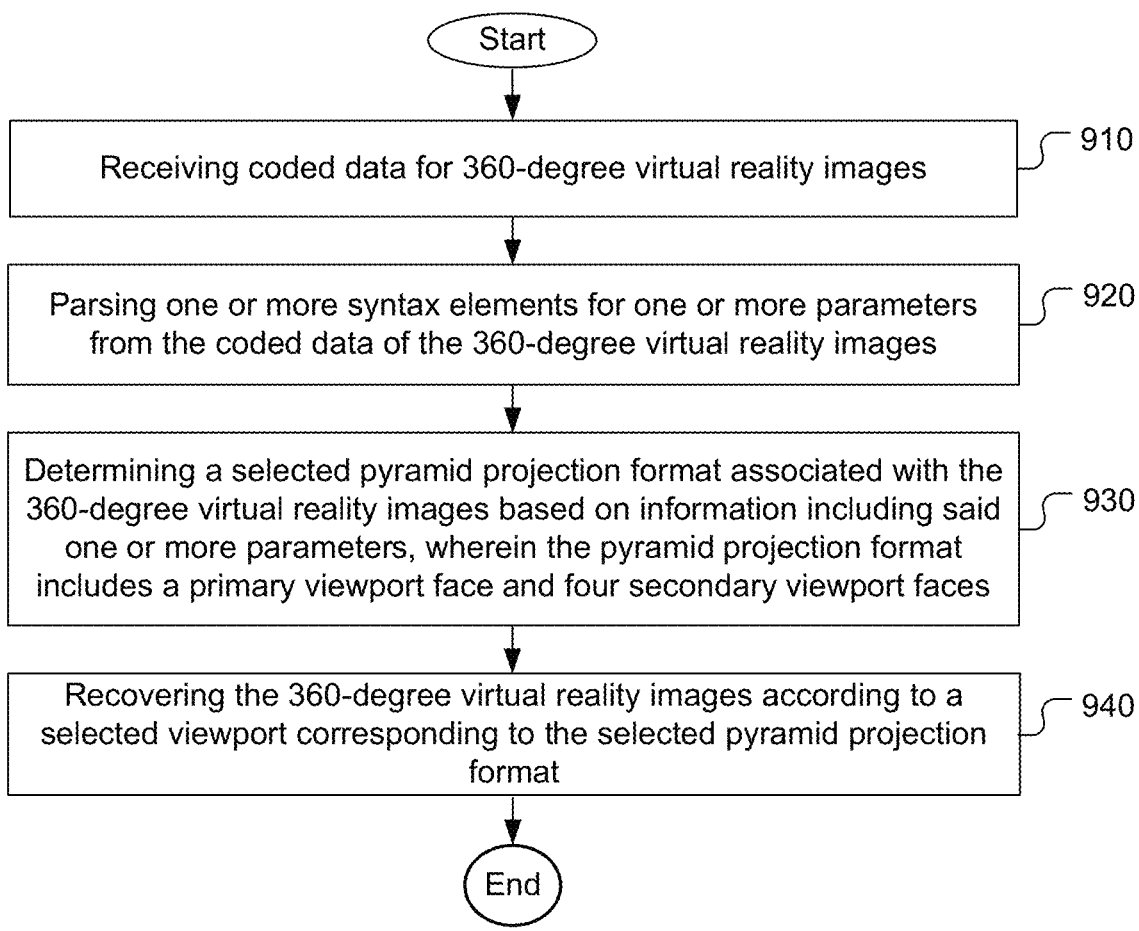
FIG. 9 illustrates an exemplary flowchart of a system for processing 360-degree virtual reality images at a receiver side or decoder side according to an embodiment of the present invention.

FIG. 9 illustrates an exemplary flowchart of a system for processing 360-degree virtual reality images at a receiver side or decoder side according to an embodiment of the present invention. Coded data for 360-degree virtual reality images are received in step 910. One or more syntax elements for one or more parameters are parsed from the coded data of the 360-degree virtual reality images in step 920. A selected pyramid projection format associated with the 360-degree virtual reality images is determined based on information including said one or more parameters in step 930, wherein the pyramid projection format includes a primary viewport face and four secondary viewport faces. The 360-degree virtual reality images are recovered according to a selected viewport corresponding to the selected pyramid projection format in step 940.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing 360-degree virtual reality images, the method comprising:
    receiving input data for 360-degree virtual reality images;
    determining a selected viewport associated with the 360-degree virtual reality images;
    determining one or more parameters related to a selected pyramid projection format corresponding to the selected viewport, wherein the pyramid projection format consists of five faces and includes a primary viewport face and four secondary viewport faces and the one or more parameters comprises a non-uniform factor for the four secondary faces;
    including one or more syntax elements for said one or more parameters in coded data of the 360-degree virtual reality images; and
    providing the coded data of the 360-degree virtual reality images as output data,
    wherein said one or more parameters comprises at least FOV (field of view) angle of main viewport face, and wherein other of the more parameters comprise yaw of main viewport centre, pitch of main viewport centre, width of main viewport face, or a combination thereof.

2. The method of claim 1, wherein said one or more parameters comprise a packing type, a displacement indicator regarding whether secondary viewport face centre displacement is allowed, horizontal face centre displacement, vertical face centre displacement, or a combination thereof.

3. The method of claim 2, wherein when the displacement indicator indicates the secondary viewport face centre displacement is allowed, one or more syntax elements for the horizontal face centre displacement, the vertical face centre displacement, or both are included in the coded data of the 360-degree virtual reality images.

4. An apparatus for processing 360-degree virtual reality images, the apparatus comprising one or more electronic devices or processors configured to:
    receive input data for 360-degree virtual reality images;
    determine a selected viewport associated with the 360-degree virtual reality images;
    determine one or more parameters related to a selected pyramid projection format corresponding to the selected viewport, wherein the pyramid projection format consists of five faces and includes a primary viewport face and four secondary viewport faces and the one or more parameters comprises a non-uniform factor for the four secondary faces;
    include one or more syntax elements for said one or more parameters in coded data of the 360-degree virtual reality images; and provide the coded data of the 360-degree virtual reality images as output data, wherein said one or more parameters comprises at least FOV (field of view) angle of main viewport face, and wherein other of the more parameters comprise yaw of main viewport centre, pitch of main viewport centre, width of main viewport face, or a combination thereof.

5. The apparatus of claim 4, wherein said one or more parameters comprise a packing type, a displacement indicator regarding whether secondary viewport face centre displacement is allowed, horizontal face centre displacement, vertical face centre displacement, or a combination thereof.

6. The apparatus of claim 5, wherein when the displacement indicator indicates the secondary viewport face centre displacement is allowed, one or more syntax elements for the horizontal face centre displacement, the vertical face centre displacement, or both are included in the coded data of the 360-degree virtual reality images.

7. A method of processing 360-degree virtual reality images, the method comprising:

receiving coded data for 360-degree virtual reality images;

parsing one or more syntax elements for one or more parameters from the coded data of the 360-degree virtual reality images;

determining a selected pyramid projection format associated with the 360-degree virtual reality images based on information including said one or more parameters, wherein the pyramid projection format consists of five faces and includes a primary viewport face and four secondary viewport faces and the one or more parameters comprises a non-uniform factor for the four secondary faces; and recovering the 360-degree virtual reality images according to a selected viewport corresponding to the selected pyramid projection format, wherein said one or more parameters comprises at least FOV (field of view) angle of main viewport face, and wherein other of the more parameters comprise yaw of main viewport centre, pitch of main viewport centre, width of main viewport face, or a combination thereof.

8. The method of claim 7, wherein said one or more parameters comprise a packing type, a displacement indicator regarding whether secondary viewport face centre displacement is allowed, horizontal face centre displacement, vertical face centre displacement, or a combination thereof.

9. The method of claim 8, wherein when the displacement indicator indicates the secondary viewport face centre displacement is allowed, one or more syntax elements for the horizontal face centre displacement, the vertical face centre displacement, or both are included in the coded data of the 360-degree virtual reality images.

10. An apparatus for processing 360-degree virtual reality images, the apparatus comprising one or more electronic devices or processors configured to:

receive coded data for 360-degree virtual reality images;

parse one or more syntax elements for one or more parameters from the coded data of the 360-degree virtual reality images;

determine a selected pyramid projection format associated with the 360-degree virtual reality images based on information including said one or more parameters, wherein the pyramid projection format consists of five faces and includes a primary viewport face and four secondary viewport faces and the one or more parameters comprises a non-uniform factor for the four secondary faces; and recover the 360-degree virtual reality images according to a selected viewport corresponding to the selected pyramid projection format, wherein said one or more parameters comprises at least FOV (field of view) angle of main viewport face, and wherein other of the more parameters comprise yaw of main viewport centre, pitch of main viewport centre, width of main viewport face, or a combination thereof.

11. The apparatus of claim 10, wherein said one or more parameters comprise a packing type, a displacement indicator regarding whether secondary viewport face centre displacement is allowed, horizontal face centre displacement, vertical face centre displacement, or a combination thereof.

12. The apparatus of claim 11, wherein when the displacement indicator indicates the secondary viewport face centre displacement is allowed, one or more syntax elements for the horizontal face centre displacement, the vertical face centre displacement, or both are included in the coded data of the 360-degree virtual reality images.

* * * * *